(12) United States Patent
Henze

(10) Patent No.: US 7,721,870 B2
(45) Date of Patent: May 25, 2010

(54) DISCHARGE APPARATUS FOR A PRODUCTION FACILITY

(75) Inventor: Wolfgang Henze, Fuerstenwalde (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 99 days.

(21) Appl. No.: 12/144,862

(22) Filed: Jun. 24, 2008

(65) Prior Publication Data

US 2009/0314606 A1 Dec. 24, 2009

(30) Foreign Application Priority Data

Jul. 4, 2007 (DE) ................ 10 2007 031 095

(51) Int. Cl.
 *B65G 41/00* (2006.01)
(52) U.S. Cl. .................... 198/346; 198/538; 198/592
(58) Field of Classification Search ............... 198/346, 198/538, 586, 592
See application file for complete search history.

(56) References Cited

U.S. PATENT DOCUMENTS

| 3,222,715 | A |   | 12/1965 | Harris |
|---|---|---|---|---|
| 3,517,430 | A | * | 6/1970 | Christal et al. ............ 29/714 |
| 4,909,697 | A | * | 3/1990 | Bernard et al. ........ 414/331.04 |
| 5,325,953 | A | * | 7/1994 | Doster et al. ............. 198/304 |
| 5,395,150 | A |   | 3/1995 | Imler et al. |
| 2003/0146066 | A1 | * | 8/2003 | Ashton ................. 198/346.2 |
| 2005/0040015 | A1 |   | 2/2005 | Schlegel et al. |

FOREIGN PATENT DOCUMENTS

| DE | 4408844 A1 | 3/1994 |
|---|---|---|
| GB | 1 148 958 | 4/1969 |
| JP | 62 157119 | 7/1987 |
| JP | 04 322979 | 11/1992 |

OTHER PUBLICATIONS

European Search Report, completed Oct. 13, 2008.
Patent Abstracts of Japan, Publication No. 62157119 dated Jul. 13, 1987.
Patent Abstracts of Japan, Publication No. 04322979 dated Nov. 12, 1992.

* cited by examiner

*Primary Examiner*—Mark A Deuble
(74) *Attorney, Agent, or Firm*—Robert N. Lipcsik

(57) ABSTRACT

The invention relates to an apparatus by which finished products or semifinished products, after being processed in a production facility (11), are dischargeable from a processing station of the relevant production facility for removal or other kind of transfer.

The discharge apparatus is essentially composed of a work platform (1) and a run-off surface (2) formed on this platform, wherein the work platform (1) is held in an elevated frame (4) of the discharge apparatus, or outer frame enclosing at least parts of a pit. Discharge of the finished products or semifinished products is effected by their movement over the run-off surface (2), the movement being assisted by conveying means (5) disposed on the work platform (1). According to the invention, the work platform (1) is rotatable without changing its position within the outer frame (4) relative to a horizontal axis (1) by 180° between two operating positions, and is lockable in these positions. In the first operating position, the run-off surface (2) faces upward, while in the second position a surface of the work platform opposite the run-off surface (2) faces upward, the surface forming a secure standing surface (3) for a person.

10 Claims, 3 Drawing Sheets

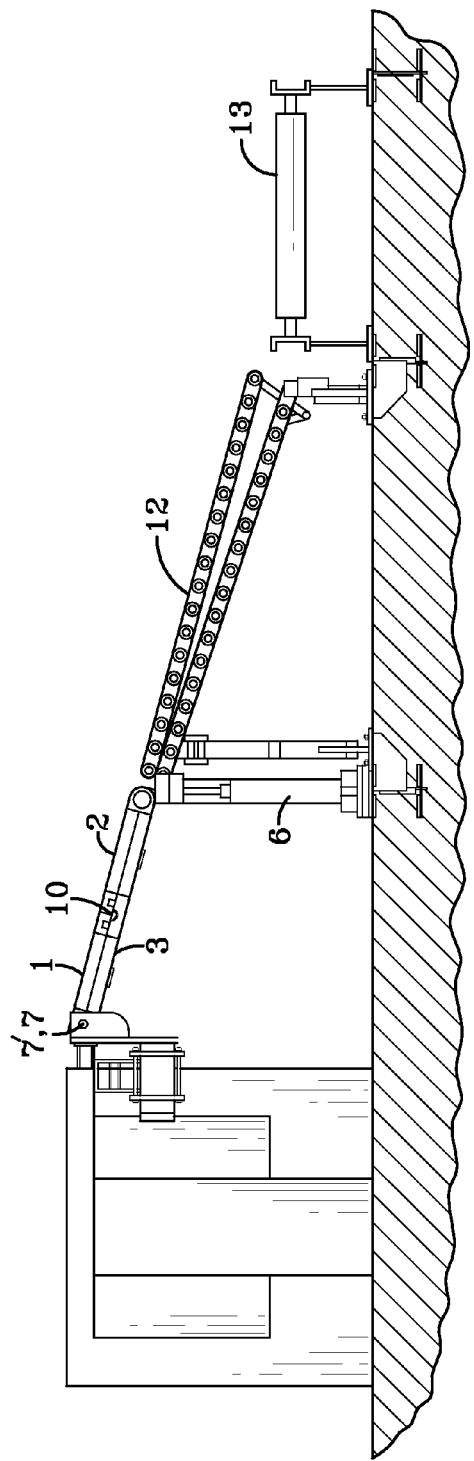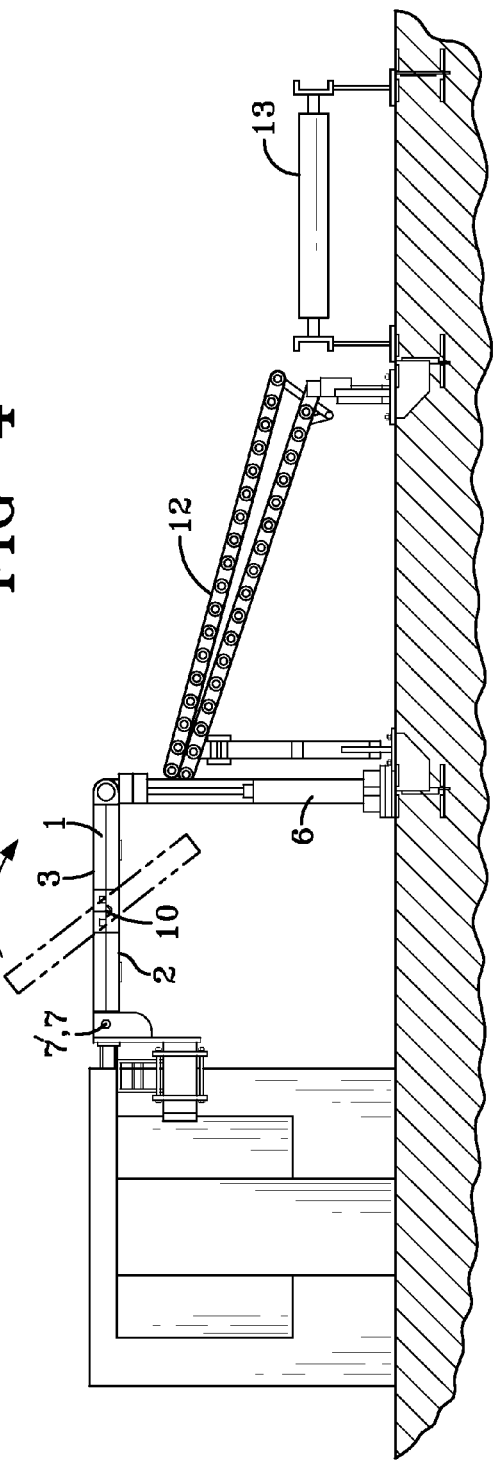

DISCHARGE APPARATUS FOR A PRODUCTION FACILITY

FIELD OF THE INVENTION

The invention relates to an apparatus by which finished products or semifinished products are dischargeable from a processing station of a relevant production facility for removal or other kind of transfer after being processed in an automatic device, a machine, or a comparable production facility. It relates in particular to an apparatus for discharge of products or semifinished products released from a vulcanizer or a hot press. Preferably, the apparatus according to the invention is provided for discharging tires from a hot press releasing the tires. Although the invention is not restricted to this use, the intention below is to describe the typical relevant factors and existing problems in a related work station in practice with reference to the fabrication of tires and their processing.

BACKGROUND OF THE INVENTION

During their fabrication, vehicle tires are subjected in one of the last processing stages to a thermal molding treatment in a hot press. Here a mold inserted in the hot press is used to generate in already preformed green tires the profile intended for the specific tire, that is, in particular its tread in the elastomer. Upon completion of the heating process and the associated thermal molding, the housing of the hot press accommodating the specific mold opens, and the tire provided with the profile is pushed out of the mold or the heating station by an ejector. Subsequently, the tire is generally deposited for cooling, then discharged from the hot press and preferably fed to a central conveyor belt. Depending on tire model, however, the thermal molding process can first be followed by a posttreatment in a so-called post-cure-inflator, and only then by the cooling and discharge of the tire. The corresponding production facilities or hot presses are usable for thermally treating different tire types. To perform a change to another tire type, what is required here is for the person operating the production facility, that is, the facility operator, to simply switch the mold accommodated by the housing. However, hot presses involve relatively complex equipment in which the housing accommodating the specific mold is not easily accessible. This is due first of all to measures of occupational safety engineering, but also due to the fact that changing molds must be effected at a position that is raised relative to the servicing bay of the equipment. To perform the mold change, the mold maker must release attachment screws in the housing accommodating the mold, take out the mold, insert another mold, and finally affix this mold in the housing by retightening the corresponding screw connection. In addition, in the course of changing molds, he/she must release the steam or condensate hoses and, after effecting the mold change, reattach these. However, since this involves relatively heavy physical work, depending on size and shape, the mold maker requires a secure standing surface for this purpose, also so as to ensure work safety. Unfortunately, however, it must be concluded that standard facilities are often not optimally designed in this regard from the point of view of the mold maker. In addition, the relevant facilities are generally not designed to have a standardized appliance for removing the tires. This is justified by the manufacturers by the fact that the space-related conditions and production-equipment-related integration with downstream equipment for subsequent conveyance or subsequent discharge of the tires is designed in very different ways by individual customers. As a result, no standard solution is offered for the direct discharge of tires from the hot press by manufacturers of these presses.

SUMMARY OF THE INVENTION

The problem to be solved by the invention is therefore to create a discharge apparatus for products processed in a production facility, which discharge apparatus takes into account the often very restricted space conditions, yet at the same time is designed such that a secure standing surface can be provided for a person operating the production facility despite these restricted space conditions.

The problem is solved by a discharge apparatus having the features of the main claim. Advantageous embodiments or developments of the invention are provided in the subordinate claims.

The discharge apparatus according to the invention is essentially composed of a work platform and a run-off surface formed on this platform, wherein the work platform is held in an elevated outer frame of the discharge apparatus, or an outer frame enclosing at least parts of a pit. After processing, finished products or semifinished products are removable via the run-off surface of the work platform from a processing station of the production facility to be removed or transferred to a transport container or transport device, or to be transferred to another processing station of the production facility. Discharge of the relevant finished products or semifinished products is effected by their movement over the run-off surface, wherein the corresponding motion is effected by the gravity of the parts, an ejection means of the releasing processing station, or by the muscle-power of a person operating the production facility, and is assisted by conveying means disposed on the work platform. According to the invention, the work platform is rotatable by 180° between two operating positions within the outer frame holding it with reference to a horizontal axis, although the platform does not change its position here. It is furthermore lockable in the two operating positions. Here, the run-off position faces upward in the first operating position, while in the second operating position a surface of the work platform opposite the run-off surface faces upward. From the surface facing upward in the second operating position, a secure standing surface for a person performing manipulating and/or controlling operations at the production facility is formed according to the invention. A consideration essential to the proposed solution is thus to assign two functions in an ultimately space-saving manner to a discharge apparatus that in many cases is required and takes up space—specifically, its actual function as a discharge apparatus to discharge objects and materials processed in a work station upon completion of the given processing stage—and the function of a standing surface for a person operating the facility, or an facility operator. Since the requirements for the two referenced functions are quite different, or to some extent are fundamentally in conflict, the work platform of the discharge apparatus is designed having two different and mutually opposing surfaces, wherein a 180° rotation of the work platform results in the given required work surface being moved into an upward-facing position. What is taken into account here is the fact that one the one hand the space conditions at such production facilities, as already addressed, are often quite limited, and that on the other hand a run-off surface for finished products or semifinished products must be designed such that their movement over the run-off surface is assisted by appropriate means, to be explained below, whereas such means are detrimental to a secure standing position for an operating person. Taking into account the above, a secure standing surface of different design relative to the run-off surface is provided by the apparatus according to the invention for an operating person without requiring additional space.

In regard to the already-referenced conveying means disposed on the discharge apparatus to assist the movement of the parts moving over the running surface, based on possible embodiments these involve balls, rolls, or rollers, the running surfaces of which project from the plane of the run-off surface or that form the run-off surface enclosed by the inner frame of the discharge apparatus. Also conceivable, however, are balls or rolls that are supported at the perimeters of the run-off surface and that project upward from the inner frame. Preferably, the run-off surface is in the form of a so-called roll conveyor. In known roll conveyors, a plurality of preferably ball-bearing-supported rolls or rollers are disposed on the run-off surface, or so as to form the run-off surface, over which the parts roll down over the run-off surface roll in a translatory motion. Optionally, the rolls or rollers, if required, can also moved with the additional assistance of a motor. The finished products or semifinished products released by the given work station of the production facility here are, for example, set by an ejector of the work station or by the human muscle power into a motion assisted by the rolls or rollers.

Optionally, movement of the objects can also be initiated by their gravity, in particular specifically when the run-off surface has an at least slight inclination. Based on an intended development of the invention, the work platform is thus designed such that in its first operating position a changeable inclination relative to the horizontal can be set with the upward-facing run-off surface. To this end, based on a possible embodiment, a pneumatic or hydraulic piston-cylinder assembly supported on the floor can be linked to the outer frame of the discharge apparatus. Depending on the rest of the design or embodiment of device, the work platform is lowerable by means of this piston-cylinder assembly at the platform's end facing away from the work station of the production facility from which the objects are to be discharged, or, in a possible alternative approach, is raisable at its end facing the production facility. What thus results is an inclined plane over which the respective objects can run down, assisted by the already-mentioned wheels, rolls, or rollers.

Depending on the following additional processes, the relevant finished products or semifinished products can be removed at the end of the run-off surface, or fed to a transport container or a transport device. In terms of the last-mentioned transport device, this can also involve, for example, a central conveyor belt or a central roll conveyor on which the products or semifinished products can be brought together from multiple production facilities for subsequent transfer. However, it is also conceivable that the respective products or semifinished products are fed by the discharge apparatus according to the invention simply to another processing station that interacts with the production facility.

The last-referenced embodiment with the run-off surface inclinable relative to the horizontal and a piston-cylinder assembly provided for this purpose is advantageously developed by an approach wherein the piston-cylinder assembly is locked by an electrically actuatable locking element when the piston is extended or when the work platform is oriented roughly horizontally, this element blocking the piston from dropping within the cylinder in the event of a pressure drop when in a de-energized state. The run-off surface opposite the run-off surface can, for example, be in the form of a grating. In addition, the work platform is locked in both operating positions against unwanted changing to its respective other operating position. In an embodiment set up for this purpose, locking bolts actuated by pull-type electromagnets are disposed on the inner sides of a frame enclosing the work platform, the bolts engaging recesses disposed on the platform's outer surfaces or an inner frame enclosing the platform to effect locking.

BRIEF DESCRIPTION OF THE DRAWINGS

The following discussion once again explains the invention in more detail based on an exemplary embodiment. In the associated drawings:

FIG. 4 shows the discharge apparatuses of FIG. 1 under a second condition as viewed from direction B.

FIG. 5 shows the discharge apparatuses of FIG. 1 under a third condition as viewed from direction B.

DETAILED DESCRIPTION OF THE INVENTION

Figure 1:
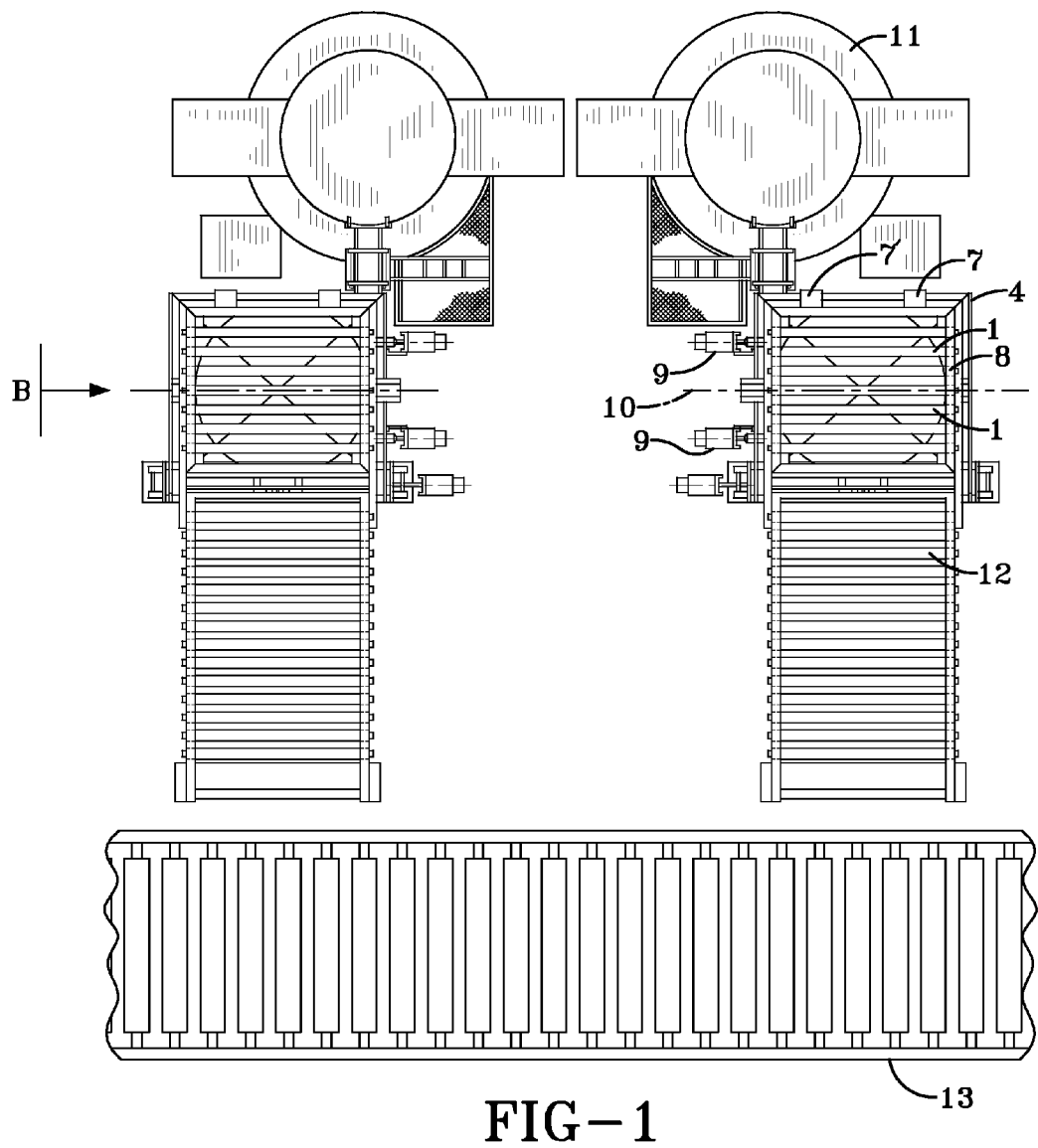
FIG. 1 is a top view showing two discharge apparatuses according to the invention.

FIG. 1 is a top view showing two discharge apparatuses according to the invention in a possible embodiment. In the example illustrated, each of the discharge apparatuses is associated with a production facility 11, here a hot press for producing tires, in which facility a profile is stamped by a mold in a thermal process into a green tire inserted in the mold. Upon completion of the molding process, the tire provided with the profile, after being released, is pushed out the mold, or moved out by an ejector. As a result, the tire for now comes to rest on the roughly horizontally oriented work platform 1 and can first cool here for some period of time. Work platform 1 here is situated in the first operating position in which its run-off surface 2, that is, the surface that enables the tire to run off after it cools, faces upward. Work platform 1 is held in an outer elevated frame 4 of the apparatus, wherein the elevation is such that the frame, on its side facing hot press 11, is attached at a raised position to constructive components of the hot press 11, and the frame's opposite side rests on the piston of a piston-cylinder assembly 6.

After the tire cools, the end of work platform 1 facing away from hot press 11 is lowered by piston-cylinder assembly 6 (see FIG. 2 and FIG. 3), which assembly is supported on the floor and is linked to outer frame 4 of the discharge apparatus, said frame accommodating work platform 1, and thereby moves work platform 1, and with it the platform's run-off surface 2, to a position that is inclined relative to the horizontal. To this end, outer frame 4 in the embodiment illustrated is connected through two link points 7, 7' to hot press 11. By pivoting about these two link points 7, 7', run-off surface 2 is moved to a position in which it forms a continuous inclined plane together with a roll conveyor 12 disposed adjacent to work platform 1 and always oriented in an inclined position. Since run-off surface 2 also constitutes a roll conveyor, a tire resting on work platform 1 can run down or roll down over the two roll conveyor segments 2, 12 of the inclined plane onto a central conveyor belt 13.

In accordance with the fundamental concept of the invention, work platform 1 is designed such that it can be rotated about a horizontal axis 10 by 180° so as to provide both run-off surface 2 as well as a standing surface 3. In the embodiment illustrated and described here, provision of standing surface 3 is necessary, for example, to enable a mold maker operating the facility to make the requisite mold change at hot press 11 when the tire type to be produced is changed. To this end, after the tire has run off, the work platform is first moved back by piston-cylinder assembly 6 to the roughly horizontal position, and work platform 1 then rotated about above-mentioned axis 10 after locking elements 9, 9' securing the platform have been released. After this 180° rotation, the side of the work platform opposite run-off surface 2 is turned upward and here constitutes a flat and secure standing surface 3 for the mold maker. The generous and stable standing surface 3 enables the mold maker from a safe position to replace the inner forming part of the heated mold with another mold functioning to generate another profile. Here work platform 1 is securely fixed in the position with standing surface 3 facing upward by the fact that locking bolts pneumatically or electrically actuated by locking elements 9, 9', the bolts beind disposed on the inside of outer frame 4 of the discharge apparatus, are inserted into recesses of inner frame 8 or of the outer edges of work platform 1. The design of locking elements 9, 9' is such that the corresponding locking bolts are inserted into the above-mentioned recesses in the off-position, that is, when electrically actuated locking elements 9, 9' are in the de-energized state. This ensures that work platform 1 remains in place in its present position if the acuating mechanism for locking elements 9, 9' fails. Piston-cylinder assembly 6 supporting work platform 1 at its end facing away from hot press 11 and providing its inclination is also secured in the second operating position in which the work platform serves as standing surface 3 for an operating person and the piston of piston-cylinder assembly 6 is extended. To this end, the piston of piston-cylinder assembly 6 is locked or engaged in the associated cylinder by a pull-type electromagnet when in the de-energized state.

Figure 2:
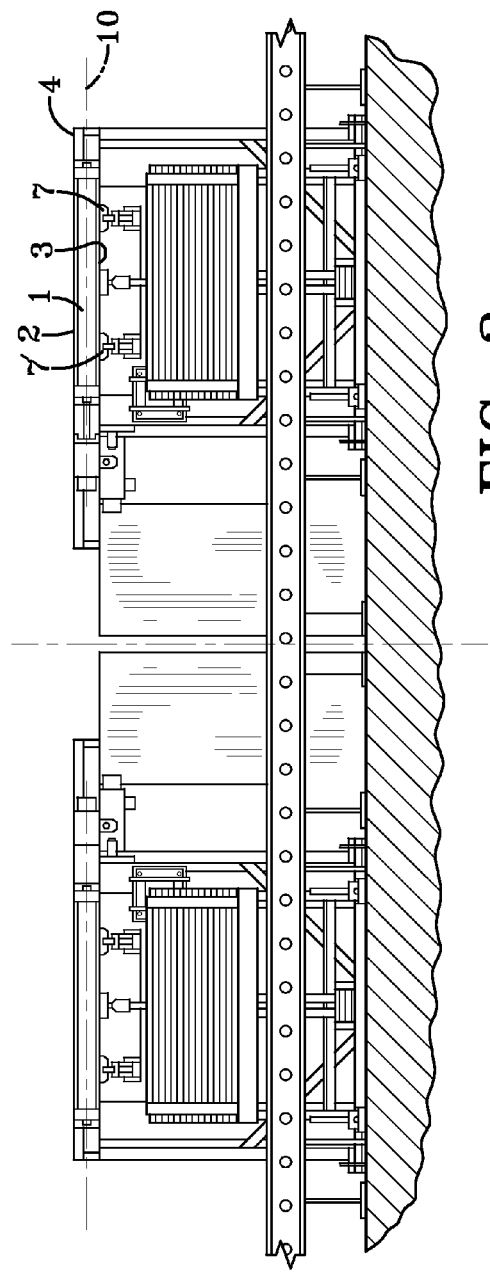
FIG. 2 shows the discharge apparatuses of FIG. 1 as viewed from the direction A.
Figure 3:
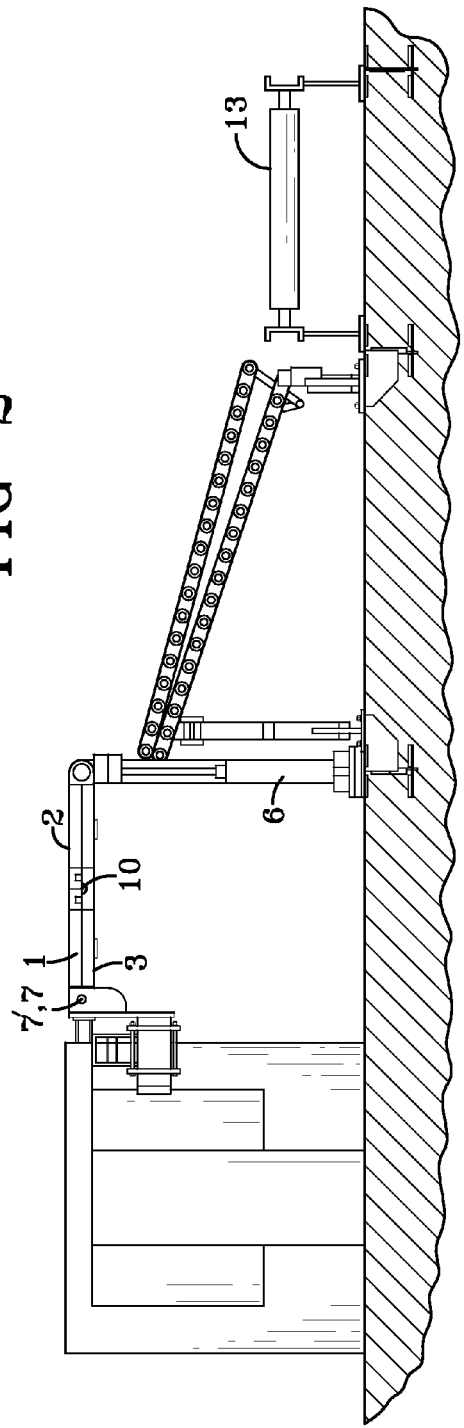
FIG. 3 shows the discharge apparatuses of FIG. 1 under a first condition as viewed from direction B.

In FIG. 2, which illustrates the view of discharge apparatuses from direction A and without the conveyor belt 13 located in front, elevated work platform 1 with its run-off surface 2 and its standing surface 8 opposite this run-off surface is seen, wherein work platform 1 at the side facing away from production facility 11, that is, the hot press, is supported on the piston of the above-mentioned piston-cylinder assembly 6 secured in the shown position by the pull-type magnet.

FIG. 3 again provides a side view from direction B of the arrangement of FIG. 1. Revealed here is that work platform 1 is inclined by piston-cylinder assembly 6, and is thereby moved into a sloped position matched to the sloped position of adjacent roll conveyor 12. The previously cooled tire rolls down over the inclined plane created thereby onto conveyor belt 13.

What is claimed is:

1. Discharge apparatus for a production facility (11), comprising a work platform (1) held in an elevated frame (4) and/or an outer frame enclosing at least parts of a pit, and a run-off surface (2) formed on this platform, by which finished products or semifinished products after processing are dischargeable from a processing station of the production facility (11) for removal or transfer to a transport container or transport device (12, 13), or for transfer to another processing station of the production facility (11), wherein their movement over the run-off surface (2) is effected by an ejection means of the processing station releasing them or by the muscle power of a person operating the production facility (11), and assisted by conveying means (5) disposed at the work platform (1), characterized in that the work platform (1) is rotatable within the frame (4) while maintaining its position relative to a horizontal axis (10) by 180° between two operating positions, and is lockable in both operating positions, wherein in the first operating position the run-off surface (2) faces upward while in the second operating position a surface opposite the run-off surface (2) faces upward, and wherein a secure standing surface (3) is provided for a person performing manipulating and/or controlling operations at the production facility (11) from the surface facing upward in the second operating position.

2. Discharge apparatus according to claim 1, characterized in that the conveying means involves balls, rolls, or rollers of a roll conveyor, the running surfaces of which project from the plane of the run-off surface (2), or that form the run-off surface (2) enclosed by an inner frame (8) of the discharge apparatus.

3. Discharge apparatus according to claim 2, characterized in that the balls, rolls, or rollers forming the conveying means (5) are supported by ball bearings.

4. Discharge apparatus according to claims 1 or 2, characterized in that the conveying means (5) is additionally motor-driven.

5. Discharge apparatus according to claim 1, characterized in that the work platform (1) of the apparatus, at least in the first operating position in which the run-off surface (2) faces upward, is tiltable relative to the horizontal into a position assisting the downward run of the finished products or semifinished products, wherein the run-off surface (2) is pivotable about at least one link point (7, 7') such that either the end of the run-off surface (2) facing away from the work station is lowerable or the surface's end facing the work station is raisable.

6. Discharge apparatus according to claim 5, wherein the run-off surface is jointly pivotable with the outer frame (4), characterized in that the piston of at least one piston-cylinder assembly (6) providing support on the floor below the work platform and hydraulically operated is linked to the outer frame to raise and lower the outer frame.

7. Discharge apparatus according to claim 6, wherein the run-off surface is jointly pivotable with the outer frame (4), characterized in that the piston of at least one piston-cylinder assembly (6) providing support on the floor below the work platform and pneumatically operated is linked to the outer frame (4) to raise and lower the outer frame.

8. Discharge apparatus according to claim 7, characterized in that the at least one piston-cylinder assembly (6) is provided with an electrical locking element that secures the piston in the extended position, which locking element prevents the piston from moving back into the cylinder in response to a failure in the hydraulic or pneumatic pressure by blocking the motion of the piston in the cylinder, the locking element being enabled in the de-energized state.

9. Discharge apparatus according to claim 8, characterized in that electrically actuated locking elements (9, 9') with locking bolts are disposed on the outer frame (4) to lock the work platform (1), which bolts in the two operating positions of the work platform (1) engage recesses formed in the outer perimeter of the work platform or in the inner frame (8) enclosing the platform, the locking bolts of the locking elements (9, 9') being inserted into the recesses when in the de-energized state.

10. Discharge apparatus according to claim 9, characterized in that the standing surface (3) facing upward in the second operating position of the work platform (1) is formed by a metal grating.

* * * * *